(12) United States Patent
Hiremath et al.

(10) Patent No.: US 11,893,544 B2
(45) Date of Patent: *Feb. 6, 2024

(54) DISTRIBUTED SYSTEM FOR TEST DRIVE CONFLICT RESCHEDULING

(71) Applicant: Capital One Services, LLC, McLean, VA (US)

(72) Inventors: Vishwanath Hiremath, Mckinney, TX (US); Satish Chikkaveerappa, Mckinney, TX (US); Ponnazhakan Subramanian, Mckinney, TX (US)

(73) Assignee: Capital One Services, LLC, McLean, VA (US)

(*) Notice: Subject to any disclaimer, the term of this patent is extended or adjusted under 35 U.S.C. 154(b) by 120 days.

This patent is subject to a terminal disclaimer.

(21) Appl. No.: 17/474,766

(22) Filed: Sep. 14, 2021

(65) Prior Publication Data

US 2021/0406842 A1 Dec. 30, 2021

Related U.S. Application Data

(63) Continuation of application No. 16/598,202, filed on Oct. 10, 2019, now Pat. No. 11,157,881.

(51) Int. Cl.
*G06Q 10/1093* (2023.01)
*G06F 16/9535* (2019.01)
*G06Q 10/109* (2023.01)
*G06Q 30/0251* (2023.01)

(52) U.S. Cl.
CPC ..... *G06Q 10/1095* (2013.01); *G06F 16/9535* (2019.01); *G06Q 10/109* (2013.01); *G06Q 30/0252* (2013.01)

(58) Field of Classification Search
CPC ............ G06Q 10/1095; G06Q 10/109; G06Q 30/0252; G06F 16/9535
See application file for complete search history.

(56) References Cited

U.S. PATENT DOCUMENTS

| | | | |
|---|---|---|---|
| 6,941,305 | B2 | 9/2005 | Magouirk et al. |
| 8,671,009 | B1 | 3/2014 | Coley et al. |
| 10,277,524 | B1 | 4/2019 | Kaitha et al. |
| 2004/0059618 | A1 | 3/2004 | Ford et al. |
| 2006/0111957 | A1 | 5/2006 | Carmi et al. |
| 2008/0313005 | A1 | 12/2008 | Nessland et al. |
| 2011/0054978 | A1 | 3/2011 | Mohil |
| 2011/0099036 | A1 | 4/2011 | Sarkissian et al. |
| 2012/0004943 | A1 | 1/2012 | Reichman |
| 2013/0226683 | A1 | 8/2013 | Bement et al. |
| 2014/0108078 | A1 | 4/2014 | Davis |
| 2014/0164043 | A1 | 6/2014 | Jordan |

(Continued)

*Primary Examiner* — Crystol Stewart
(74) *Attorney, Agent, or Firm* — Banner & Witcoff, Ltd.

(57) ABSTRACT

Aspects discussed herein may relate to methods and techniques for automatically generating a test drive schedule for a user based on known inventory, user preferences, demographic information, employee availability, and other factors, as well as detecting conflicts and rescheduling test drives in response to those conflicts. This may allow for easier access to test drives for the consumer, which may promote more test drives and higher resultant sales, as well as allowing for rescheduling in advance of conflicts, which may reduce lost consumers due to test drives that were conflicted.

18 Claims, 5 Drawing Sheets

(56) References Cited

U.S. PATENT DOCUMENTS

| | | | |
|---|---|---|---|
| 2014/0316835 A1* | 10/2014 | Cortes | G06Q 10/1095 |
| | | | 705/7.19 |
| 2015/0006223 A1 | 1/2015 | Leslie et al. | |
| 2015/0234570 A1 | 8/2015 | Hampson et al. | |
| 2015/0345984 A1 | 12/2015 | Graham | |
| 2015/0379479 A1 | 12/2015 | Nagaraj | |
| 2016/0092581 A1* | 3/2016 | Joshi | G06F 16/9535 |
| | | | 707/732 |
| 2016/0379173 A1 | 12/2016 | Karnati et al. | |
| 2017/0155960 A1 | 6/2017 | Christensen et al. | |
| 2017/0169398 A1* | 6/2017 | Washington | G06Q 10/1095 |
| 2017/0269606 A1 | 9/2017 | Kawabata | |
| 2017/0316386 A1 | 11/2017 | Joshi et al. | |
| 2017/0330396 A1 | 11/2017 | Yehezkel et al. | |
| 2017/0337573 A1 | 11/2017 | Toprak et al. | |
| 2018/0032928 A1* | 2/2018 | Li | G06Q 10/08 |
| 2018/0204282 A1 | 7/2018 | Painter et al. | |
| 2018/0349975 A1 | 12/2018 | Lee | |
| 2019/0019161 A1 | 1/2019 | Yasarapu et al. | |
| 2019/0049948 A1 | 2/2019 | Patel et al. | |
| 2019/0138953 A1 | 5/2019 | Caudillo et al. | |
| 2019/0213559 A1 | 7/2019 | Beltran | |
| 2019/0332915 A1 | 10/2019 | Devdutt et al. | |
| 2020/0111140 A1 | 4/2020 | Geake | |
| 2021/0117872 A1 | 4/2021 | Edwards et al. | |

* cited by examiner

DISTRIBUTED SYSTEM FOR TEST DRIVE CONFLICT RESCHEDULING

CROSS-REFERENCE TO RELATED APPLICATIONS

The instant application is a continuation of and claims priority to U.S. patent application Ser. No. 16/598,202, titled "DISTRIBUTED SYSTEM FOR TEST DRIVE CONFLICT RESCHEDULING," filed Oct. 10, 2019, the disclosure of which is hereby incorporated by reference in its entirety.

FIELD OF USE

Aspects of the disclosure relate generally to the field of automated systems for rescheduling calendar appointments. More specifically, aspects of the disclosure may provide for enhanced handling of test drive scheduling and conflict avoidance.

BACKGROUND

Current systems often require a user to manually call or email a dealership to schedule a test drive appointment, and lack sophisticated means of detecting conflicts. Aspects described herein may address these and other problems, and generally improve the quality, efficiency, and speed of automated scheduling systems by offering robust scheduling and conflict avoidance features.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for an automated system for scheduling and rescheduling test drives based on known inventory, user preferences, demographic information, employee availability, conflicts and/or other factors. This may have the effect of encouraging consumers to take more test drives, and reducing the number of test drives that are canceled with no replacement. According to some aspects, these and other benefits may be achieved by using two-way communication to schedule test drives based on known dealer inventory in a centralized scheduling system. This combination of features may allow for easier access to test drives for the consumer, which may promote more test drives and higher resultant sales, as well as allowing for rescheduling in advance of conflicts, which may reduce lost consumers due to test drives that were conflicted.

More particularly, some aspects described herein may provide a computer-implemented method for scheduling one or more test drives. A device may receive, via two-way communication with a device associated with a user, a first request to schedule a test drive. The first request may comprise user preferences for a vehicle. The device may determine, via two-way communication (which may comprise communication via a streaming platform) with a database and based on the user preferences, a first availability of one or more vehicles. The device may transmit, via two-way communication with the dealer server, an interactive calendar appointment associated with the first availability. The device may determine, via two-way communication with the dealer server, based on received feedback from the interactive calendar appointment, a first set of dates for the test drive. The device may transmit, via two-way communication with the device, the first set of dates. The device may receive, via two-way communication with the device, a first scheduled day for the test drive. The device may determine, at a threshold time before the first scheduled day, a conflict for the first scheduled day at a location for the test drive. The device may transmit, via two-way communication with the device (e.g., based on the conflict), a notification to the device indicating the conflict. The device may receive, via two-way communication with the device, an interaction with the notification indicating a second request to schedule the test drive. The device may determine, via two-way communication with the dealer server, a second availability of the one or more vehicles. The device may transmit, via two-way communication with the dealer server (e.g., based on the second availability), a revised interactive calendar appointment. The device may determine, via two-way communication with the dealer server (e.g., based on received feedback from the revised interactive calendar appointment), a second set of dates for the test drive. The device may transmit, via two-way communication with the device, the second set of dates. The device may receive, via two-way communication with the device, a second scheduled day for the test drive.

According to some embodiments, notifications may comprise an interactive option to reschedule test drives, which may comprise an indication that the test drive has been canceled. The conflict may comprise a chance of bad weather (e.g., weather that exceeds a threshold, which may be based on one or more capabilities of the one or more vehicles). The first set of dates may be determined based on a number of available employees, wherein the number of available employees exceeds a threshold. The one or more vehicles may be determined based on correlating demographic information associated with the user with the user preferences and known demographic information for past test drives of a plurality of vehicles. Further, a recommended schedule to test drive one or more additional vehicles may be determined based on demographic information associated with the user, and based on an availability of the one or more additional vehicles associated with an additional dealer.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for automatically generating a test drive schedule for a user based on known inventory, user preferences, demographic information, employee availability, and/or other factors, as well as detecting conflicts and rescheduling test drives in response to those conflicts. As discussed further herein, this combination of features may allow for easier access to test drives for the consumer, which may promote more test drives and higher resultant sales, as well as allowing for rescheduling in advance of conflicts, which may reduce lost consumers due to test drives that were conflicted.

Before discussing these concepts in greater detail, however, several examples of a computing device that may be used in implementing and/or otherwise providing various aspects of the disclosure will first be discussed with respect to FIG. 1.

Figure 1:
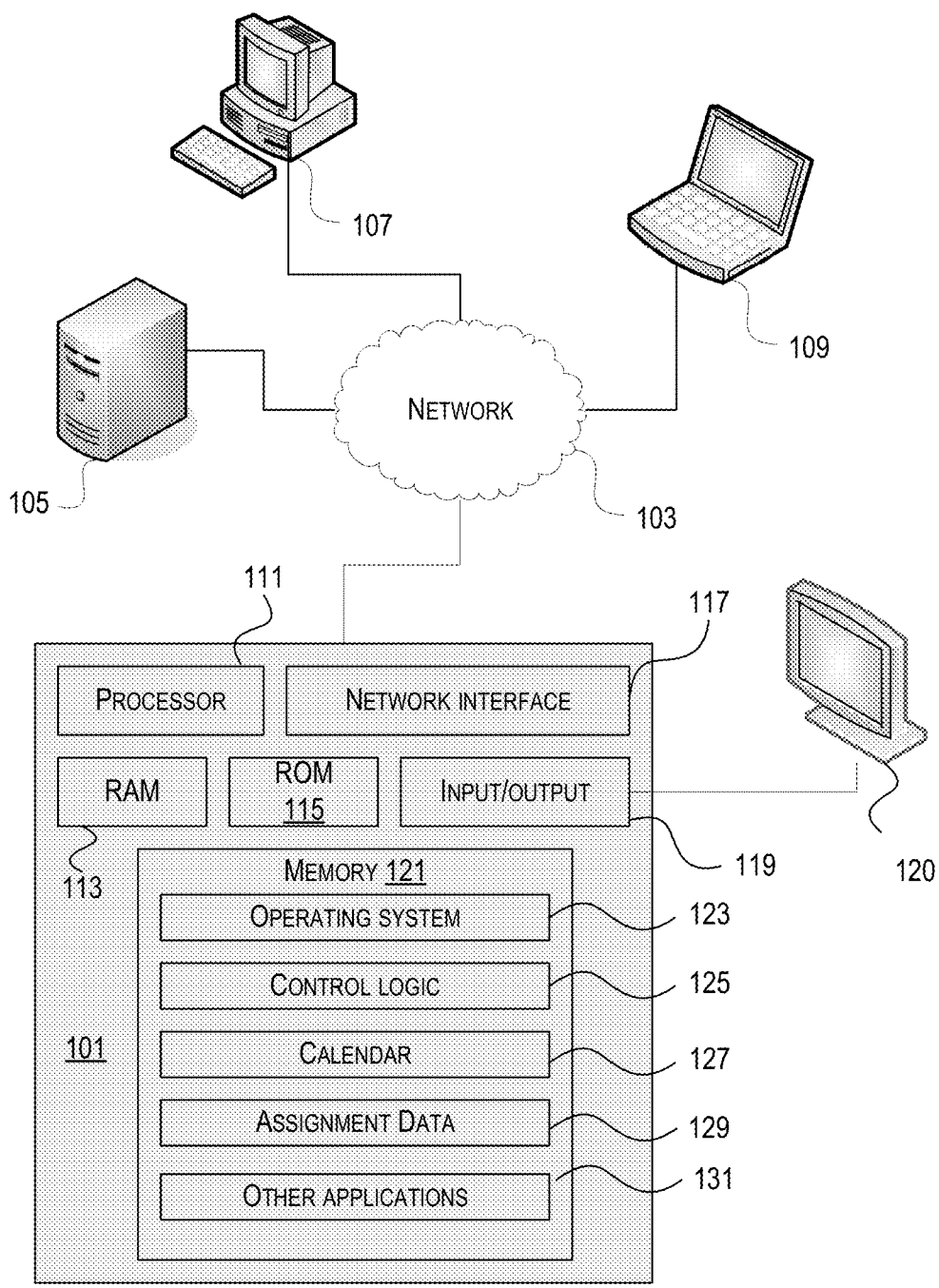
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves and/or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, calendar 127, assignment data 129, and other applications 131. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
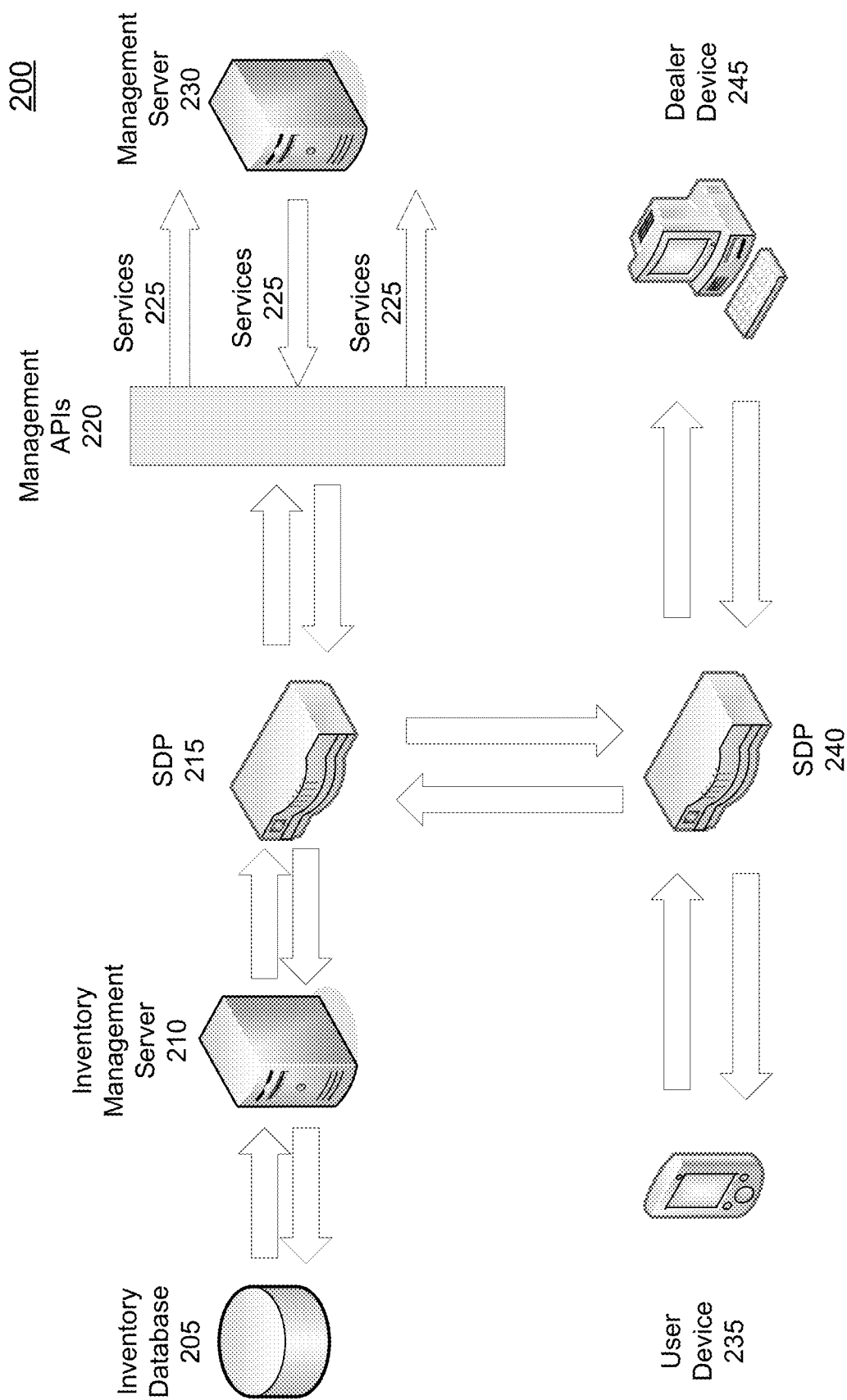
FIG. 2 depicts an example distributed server architecture according to one or more aspects of the disclosure.

FIG. 2 illustrates an example distributed server architecture 200 according to one or more aspects of the disclosure for scheduling test drives using two-way communication in accordance with one or more aspects described herein. The various devices of architecture 200 may be implemented by any suitable computing software and/or hardware, such as using computing devices 101, 105, 107, and/or 109 of FIG. 1.

A user device 235 may comprise a consumer device (such as a smartphone, tablet, laptop, desktop, embedded computing device, or any other such consumer computing device) that provides a terminal for interacting with a user (e.g., a consumer). For example, the user device 235 may be a smartphone configured to display a graphical user interface depicting vehicle options, calendar information, notifications, pricing information, contact information (e.g., email), etc.

The user device 235 may communicate with one or more other devices via one or more streaming data platforms (SDPs), such as SDP 215 and/or SDP 240. While FIG. 2 depicts an example utilizing two SDPs, any number of SDPs may be used. SDPs may provide two-way communication between two or more devices. For example, SDP 240 and SDP 215 may provide two-way communication between a user device 235 and a management server 230.

The management server 230 may be a server that provides one or more management services 225 for interacting with various devices. The management services 225 may be available to the various devices through an interface, such as management application programming interfaces (APIs) 220. One example of a management service 225 may be a service for selecting vehicles for a test drive (such as may be described herein). The management server 230 may communicate (e.g., via one or more SDPs using one or more services) with the user device 235 to determine that a user wishes to schedule a test drive. The management server may communicate with an inventory management server 210 to determine available vehicles. The management server 230 may then communicate with the user device 235 to provide a listing of information, such as what inventory is available at a given date or time.

The inventory management server 210 may be a server that has access to an inventory database 205 that provides a listing of various inventory (e.g., vehicles). For example, the inventory management server 210 may store and/or retrieve information regarding vehicles available at one or more dealerships, including when those vehicles are reserved (e.g., for a test drive, maintenance, cleaning, etc.).

A dealer device 245 may also be connected (e.g., via one or more SDPs) to one or more devices of the architecture 200. The dealer device 245 may be any suitable computing device or devices, such as a server, a desktop, a laptop, a smartphone, a tablet, any such device, or any combination of such devices. The dealer device 245 may communicate with a management server 230 and/or user device 235 to determine requests and/or scheduling for one or more test drives. Further, the dealer device 245 may communicate with an inventory management server 210 to update available inventory. For example, the dealer device 245 may mark a vehicle as unavailable for a period of time due to pending maintenance. In another example, the dealer device 245 may update the inventory management server 210 to indicate that a vehicle has been added or removed from a lot associated with the dealer device 245.

Having discussed several examples of computing devices which may be used to implement some aspects as discussed further below, discussion will now turn to a message flow diagram 300 for scheduling test drives.

Figure 3:
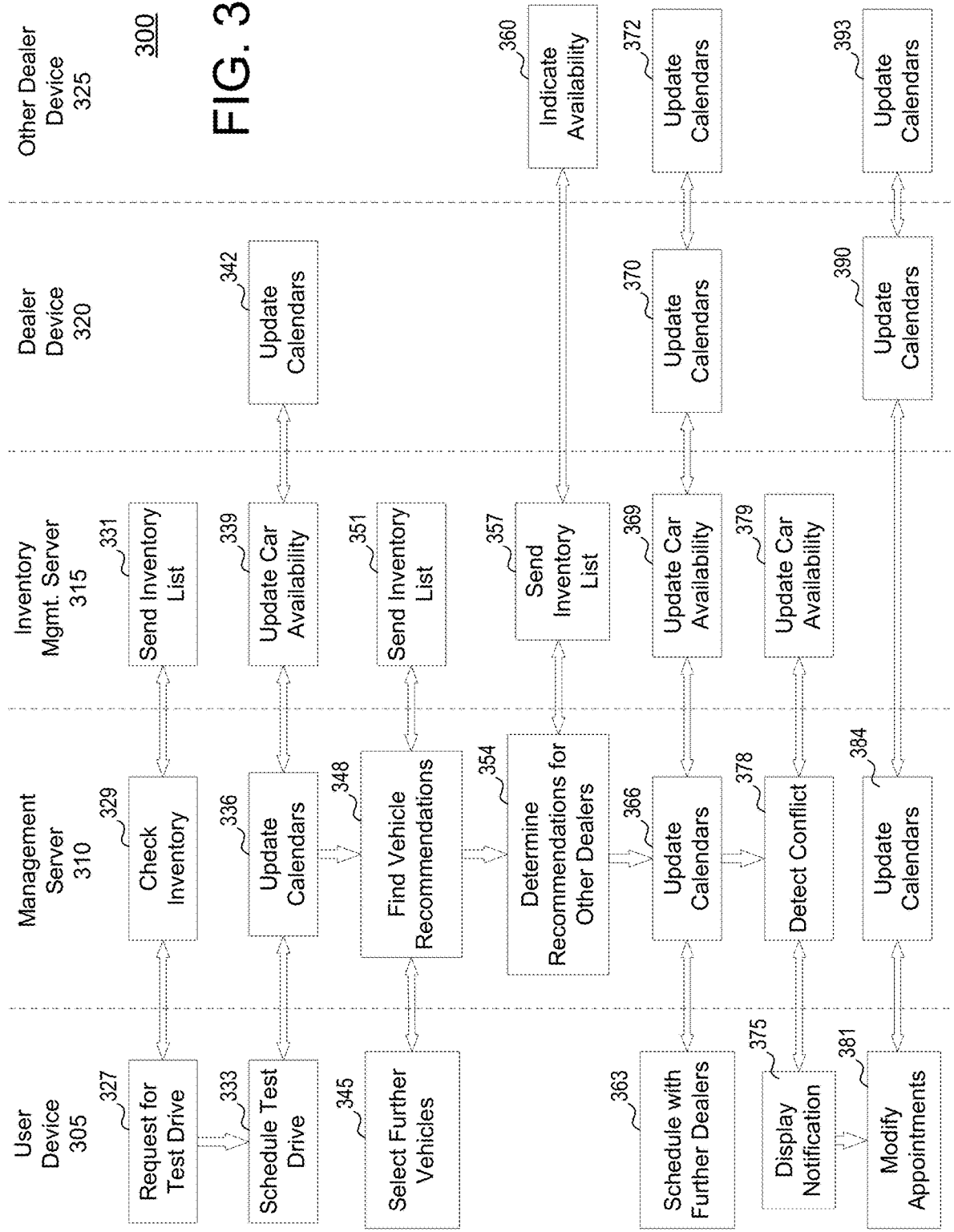
FIG. 3 depicts an example diagram indicating how various devices may use two-way communication to work together according to one or more aspects of the disclosure.

FIG. 3 illustrates an example diagram 300 indicating how various devices may use two-way communication to work together to effect one or more methods and processes described herein. Examples of devices may be a user device 305 (which may be a user device 235), a management server 310 (which may be a management server 230), an inventory management server 315 (which may be an inventory management server 210 and/or inventory database 205), a dealer device 320 (which may be a dealer device 245), and/or another dealer device 325 (which may be one or more other dealer devices 245). The devices may communicate via one or more communication links and/or SDPs (e.g., SDP 215 and/or SDP 240). Communication may occur using two-way communication. Two-way communication may allow steps to be performed in concert between multiple devices. For example, as a user selects vehicles and/or scheduling options on a user device 305, inventory and calendar updates may be continually updated on a management server 310, inventory management server 315, and/or dealer device 320. In this manner, data may be synchronized across multiple devices to efficiently effect the systems and methods described herein.

At step 327, the user device 305 may initiate a request for a test drive. The request may be received using a user interface, such as a website, application, or other such interface. The request may be transmitted to the management server 310, which may check inventory at step 329. The management server 310 may retrieve an inventory list from the inventory management server 315, which may be sent at step 331. The inventory list may be sent to the user device 305, or may be sent to the management server 310 for processing (e.g., to be sorted, formatted, and/or collated based on vehicle recommendations and/or user preferences received from the user device 305) before being sent to the user device 305. Vehicle recommendations may be generated, for example, using demographic information associated with the user device 305, which may be determined by the management server 310 based on a user known to be associated with the user device 305.

At step 333, the user device 305 may schedule a test drive. For example, the user device 305 may present an interface with one or more vehicles (e.g., using an inventory list received via inventory management server 315). The interface may depict available vehicles, and may indicate when those vehicles are available. For example, the user device 305 may receive an indication that a user wishes to select a vehicle for a test drive on a Monday, and may then select from vehicles available on that Monday. The management server 310 may update one or more calendar pages at step 336. For example, the management server 310 may update a calendar kept on the management server 310, a calendar of test drives on the user device 305, and/or calendars of the dealer device 320. The dealer device 320 may further update one or more calendar entries by scheduling employees to oversee test drives and meet with a customer. For example, a salesman may be assigned automatically based on availability on the timeslots selected on the user device 305. This schedule may be transmitted to the management server 310 and/or user device 305 (e.g., so that a customer can see on the user device 305 a schedule for test drives and a salesman to meet at a dealership). The management server 310 may update vehicle availability (e.g., mark scheduled vehicles unavailable) via the inventory database server 315 at step 339.

At step 348, the management server 310 may make additional vehicle recommendations. The management server 310 may determine one or more available vehicles to fill out a scheduling block (e.g., a test drive before/after scheduled test drives, or a test drive in a gap in a schedule determined as in step 333). The management server may determine available vehicles based on an inventory list retrieved from an inventory management server 315, as may be discussed at step 351. The management server 310 may determine what vehicles to recommend based on demographic information. For example, demographic information may be associated with the user device 305, which may be determined by the management server 310 based on a user known to be associated with the user device 305. At step 345, the user device 305 may display the list of recommended vehicles and receive a selection of which vehicles (if any) to schedule.

At step 354, the management server 310 may determine recommendations for vehicles from other dealers. The management server 310 may determine other dealerships that are in proximity to the first dealership for which the user may wish to schedule a test drive. For example, the other dealerships may have different pricing, different vehicles, different brands, etc. The management server 310 may determine vehicles available from other dealers based on an inventory list received from the inventory management server 315 at step 357. In some instances, the management server 310 may query an other dealer device 325 for availability of test drives. For example, the management server 310 may generate an email for another dealer device 325 requesting that they log in using an internet link in order to indicate time slots and/or inventory to be recommended for a user.

At step 366, the management server 310 may coordinate an updated test drive schedule including any further scheduled test drives (e.g., of recommended vehicles and/or of test drives from other dealers). The management server 310 may generate a recommended calendar comprising one or more test drive options to the user device 305. In some instances, the user device 305 may present multiple, alternative options for a schedule. The user device 305 may receive a selection of a schedule at step 363. The management server 310 may update vehicle availability at step 369 to mark scheduled vehicles as unavailable. Further, at steps 370 and/or 372, dealer devices 320 and/or 325 may update respective calendars to indicate scheduled test drives and/or determine salesman assignments.

At step 378, the management server 310 may detect a scheduling conflict. For example, the management server 310 may detect that one or more salesmen are unavailable to perform a test drive and the test drive must be rescheduled. In another example, the management server 310 may determine that one or more vehicles have been marked unavailable (e.g., due to maintenance or being purchased) based on information from inventory management server 315 at step 379. In some instances, the management server 310 may monitor for other conflicts. For example, the management server 310 may monitor for weather conditions. If a threshold condition is met (e.g., a precipitation percentage, precipitation amount, precipitation type, temperature, wind speed, weather service warning, any combination of these with any weight, or any other such metric), the management server may automatically determine a potential conflict. Upon detecting a conflict, the management server 310 may notify the user device 305 so that the user device 305 may display a notification. The notification may provide an option for the user to cancel or reschedule one or more test drives, as appropriate. In some instances (e.g., if the conflict is due to no salesman being available), the user may choose to maintain the schedule (e.g., even though they may be notified that they may have to wait for an open salesman).

At step 381, the user device 305 may receive modified appointments from the user. For example, the user may adjust the calendar to select alternative times, vehicles, and/or dealers as needed to account for the conflict. The management server 310 may update one or more calendars, such as its own calendar, or calendars at the dealer devices 320 and/or 325 in steps 390 and/or 393.

Figure 4:
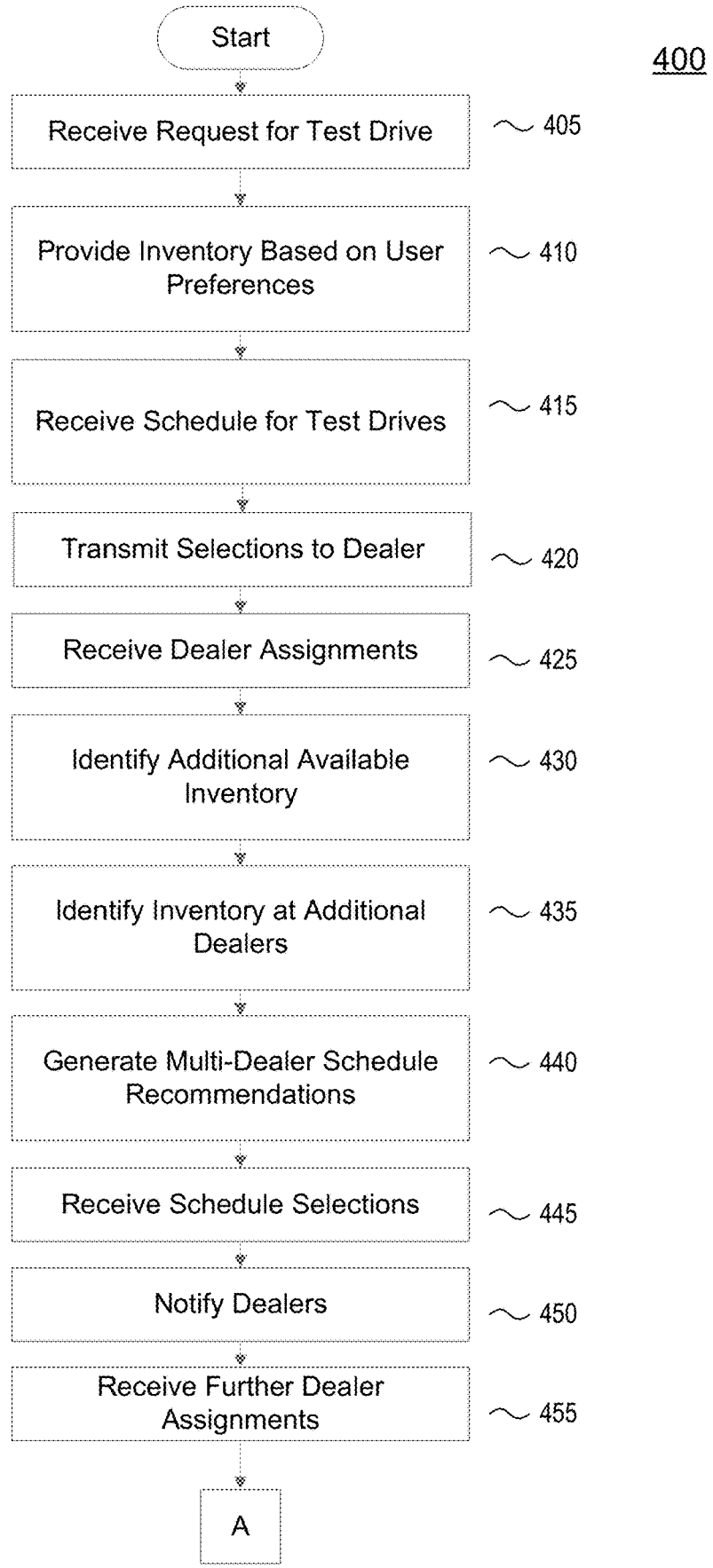
FIG. 4 depicts an example method for scheduling a test drive according to one or more aspects of the disclosure.

FIG. 4 illustrates an example method 400 for scheduling a test drive in accordance with one or more aspects described herein. Method 400 may be implemented by a suitable computing system, as described further herein. For example, method 400 may be implemented by any suitable computing environment by a computing device and/or combination of computing devices, such as computing devices 101, 105, 107, and 109 of FIG. 1. For example, recommendations may be generated using machine learning and/or demographic information.

At step 405, the system may receive a request for a test drive. A request may be received at a user device (e.g., a user device 235 or user device 305), and may be transmitted to a management server (e.g., a management server 230 or a management server 310). The request may be received using a user interface, such as a website, application, or other such interface. The user may indicate one or more preferences, such as make of vehicle, model of vehicle, year of vehicle, mileage of vehicle, color of vehicle, trim of vehicle, price of vehicle, location of vehicle or dealership (which may be an area, such as a radius around a location or zip code), type of vehicle (e.g., SUV, crossover, sedan), number of seats, number of doors, or any other such preference.

At step 410, the system may determine inventory based on user preferences. The management server may retrieve an inventory list from the inventory management server (e.g., inventory management server 210, inventory database 215, and/or inventory management server 315). The inventory list may indicate what vehicles are available at one or more dealer sites, and may also indicate when the vehicles are available (e.g., if a vehicle is unavailable due to a test drive, maintenance, cleaning, etc.). The management server may process the inventory list based on the user preferences (e.g., to be sorting or formatting vehicles based on the user preferences). Further, vehicle recommendations may be generated, for example, using demographic information associated with the user device. The recommendations may be determined by the management server based on user profile information for a user known to be associated with the user device. For example, a minivan in a particular price range may be recommended based on a user having a particular income and multiple children. In some instances, such as if a dealer has too many test drives assigned for a given day, the system may not allow a test drive to be scheduled on that day.

At step 415, the system may receive a schedule for a test drive. The management server may determine one or more scheduling options based on vehicle availability. The system may present an interface on the user device that allows the user to schedule vehicle test drives from among the options. The interface may depict available vehicles, and may indicate when those vehicles are available. For example, the user device may display an interface that allows a user to select a vehicle for a test drive on a Monday, wherein the user may select from vehicles available on that Monday. The user device may transmit the selections to the management server in order update one or more calendar entries. For example, the management server may update a relational calendar kept on the management server.

At step 420, the system may transmit the selections to a dealer device (e.g., a dealer device 320 and/or a dealer device 245). The transmission may indicate what vehicles have been selected such that the dealer can assign vehicles to a salesman.

At step 425, the system may receive one or more dealer assignments. The dealer (e.g., using the dealer device) may update one or more calendar entries by scheduling employees to oversee test drives and meet with a customer. For example, dealer assignments may be recommended based on availability on the timeslots selected on the user device. In another example, dealer assignments may be recommended based on the fewest number of test drives scheduled in a time period. In yet another example, dealer assignments may be recommended based on demographic information (e.g., salesmen may be assigned based on their relative sales performance regarding particular demographics). Recommended dealer assignments may be automatically entered by the system by default, or may provide one or more recommendations from which a manager may select on the dealer device.

At step 430, the system may make additional vehicle recommendations. The management server may determine one or more available vehicles to fill out a scheduling block (e.g., a test drive before/after scheduled test drives, or a test drive in a gap between currently scheduled test drives). The management server may determine available vehicles based on an inventory list retrieved from an inventory management server. The management server may determine what vehicles to recommend based on demographic information. For example, a consumer with children who has asked to look at 2-door cars may also be presented with options for sedans or SUVs that can accommodate the children. This may have the advantage of promoting sales by presenting the consumer with additional vehicles they might consider.

At step 435, the system may determine recommendations for vehicles from other dealers. The management server may determine other dealerships to include that are in proximity to the first dealership for which the user may wish to schedule a test drive. For example, the other dealerships may have different pricing, different vehicles, different brands, etc. The management server may determine vehicles available from other dealers based on an inventory list received from the inventory management server. In some instances, the management server may query the other dealer for availability of test drives. For example, the management server may generate an email for another dealer device (e.g., an additional dealer device 245 or an other dealer device 325) requesting that the dealer log in using an internet link in order to indicate time slots and/or inventory to be recommended for a user. Recommendations for vehicles from other dealerships may be provided based on user preferences and/or demographic information. For example, the management server may assign vehicles often purchased by a consumer who is looking at vehicles identified in step 415. Providing recommendations for other dealerships may have the advantage of encouraging customers to look at vehicles (e.g., from other brands) and dealerships they might not otherwise consider.

At step 440, the system may generate additional test drive schedules incorporating the recommended vehicles. The additional test drive schedules may present one or more alternatives for further scheduled test drives (e.g., of recommended vehicles and/or of test drives from other dealers). The management server may generate a recommended calendar comprising one or more test drive options to the user device. In some instances, the user device may present multiple, alternative options for a schedule. For example, the user may have multiple options for a second dealership to visit, each with a recommended set of vehicles to test drive.

At step 445, the system may receive selections regarding recommended vehicles and additional dealers. The management server may update vehicle availability to mark scheduled vehicles as unavailable.

At step 450, the system may notify the dealers of the updated schedule. Using the updated schedule, any additional dealer assignments may be updated using the dealer devices. The system may then begin monitoring for any potential conflict, which may be depicted starting with block A of FIG. 5.

Figure 5:
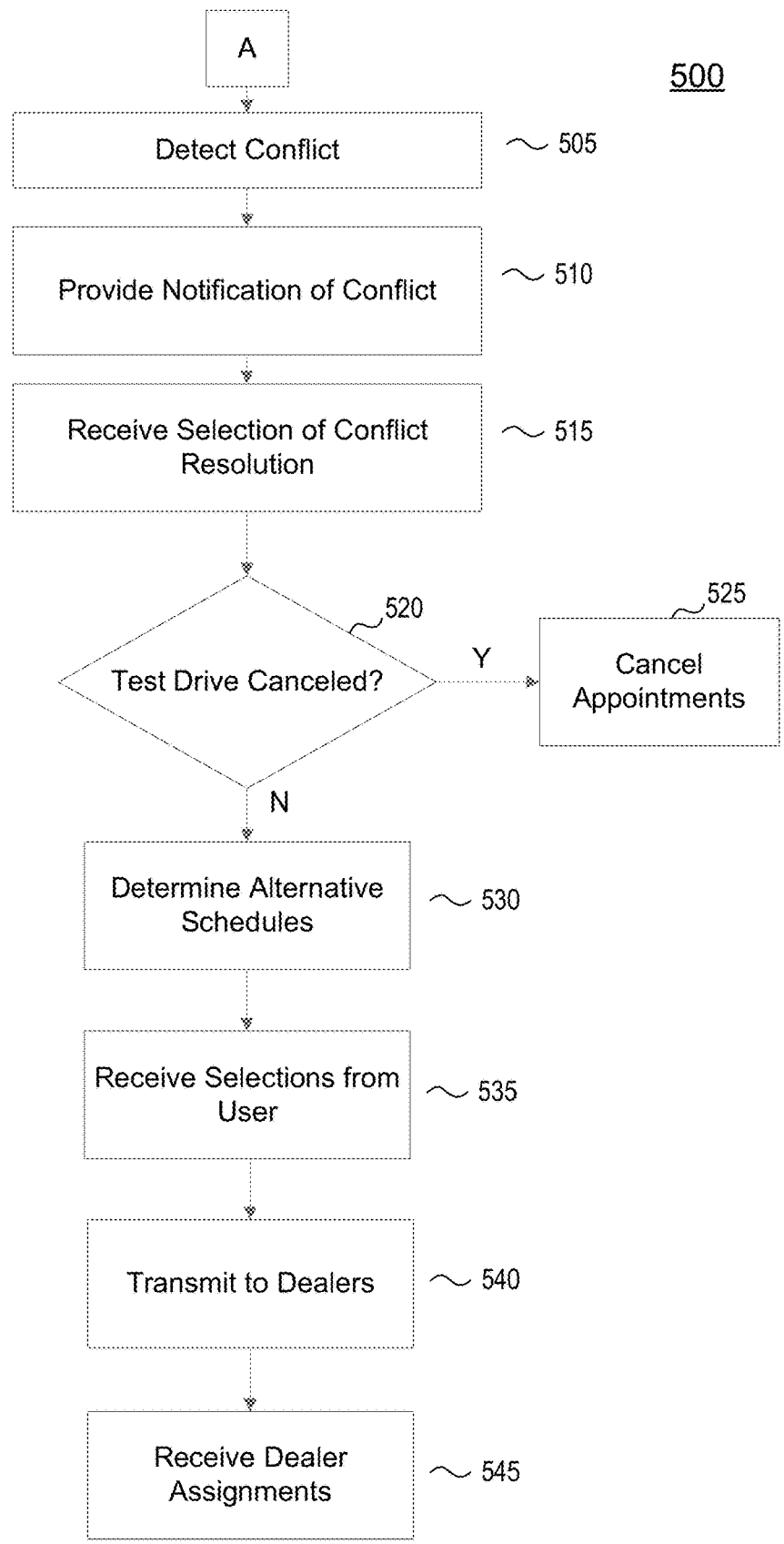
FIG. 5 illustrates an example method for updating a test drive according to one or more aspects of the disclosure, which may be a continuation of FIG. 4.

FIG. 5 illustrates an example method 500 for updating a test drive due to a conflict in accordance with one or more aspects described herein. Method 500 may follow method 400 at block A, and may be implemented using the same devices as discussed above in FIG. 4. For example, scheduling recommendations may be generated using machine learning and/or demographic information.

At step 505, the system (e.g., using a monitoring management server) may detect a scheduling conflict, such as may be discussed regarding step 378 above. For example, the management server may detect that a ratio of test drives scheduled for a given day to the number of available salesman exceeds a threshold and the test drive must be rescheduled. In another example, the management server may determine that one or more vehicles requested for a test drive are unavailable (e.g., due to maintenance or being purchased) based on information from an inventory management server. In some instances, the management server may monitor for other conflicts. For example, the management server may monitor for weather conditions. If a threshold weather condition is met (e.g., a precipitation percentage, precipitation amount, precipitation type, temperature, wind speed, weather warning, any combination of these with any weight, or any other such metric), the management server may automatically determine a potential conflict. The threshold may be further based on other factors. For example, a weather threshold may be modified depending upon the capabilities of a vehicle to be test driven (e.g., a higher threshold for an SUV that can tolerate rain and snow, and a lower threshold for a sports car). In another example, the threshold may be modified based on demographic information. For example, a family with multiple children may be less tolerant of bad weather or delays due to understaffing than a single man.

At step 510, the system may notify the user device so that the user device may display a notification (e.g., an application popup, email, text message, etc.). The notification may provide an option for the user to cancel or reschedule one or more test drives, as appropriate. In some instances (e.g., if the conflict is due to no salesman being available), the user may choose to maintain the schedule (e.g., even though they may be notified that they may have to wait for an open salesman) By prompting the user of an impending conflict, this may have the advantage of allowing the user to reschedule on his or her own time, rather than to discover at the time of the test drive that the test drive cannot be performed as expected.

At step 515, the system may receive modified appointments from the user. For example, the user may adjust the calendar to select alternative times, vehicles, and/or dealers as needed to account for the conflict. At step 520, the system may determine if the user wishes to cancel one or more test drives. If so, the system cancels the respective appointments. If the user wishes to modify an appointment, the system may proceed with determining alternative schedules at step 530.

At step 530, the system may determine alternative schedules. For example, the system may use an inventory list to determine when the selected vehicles (or a similar vehicle) would be available. In another example, the system may indicate when a conflict (e.g., a lack of dealer personnel or bad weather conditions) will be resolved and a test drive can be scheduled. In some instances, the system may provide alternative vehicles or dealerships to visit (e.g., if a vehicle is no longer available or a dealership has limited availability).

At step 535, the system may receive selections at the user device of the user's new schedule. The system may transmit the updated schedule to dealers at step 540. At step 545, the system may receive updated dealer assignments based on the new schedule. For example, the system may remove or notify a dealer of a change, and the dealer may (manually or automatically) specify a salesman for a given slot. In some instances, if a salesman was initially assigned for a test drive, that salesman may be automatically re-assigned if he is available for the new schedule.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A management server comprising:
   one or more processors; and
   a memory storing instructions that, when executed by the one or more processors, cause the management server to:
   receive, via two-way communication with a device associated with a user, a first request to schedule a test drive, wherein the first request comprises user preferences for a vehicle, wherein two-way communication comprises communication via a streaming data platform;
   determine, via two-way communication with a database and based on the user preferences, based on received feedback from the device via an interactive calendar appointment, a first scheduled day for a test drive of one or more selected vehicles;
   determine, based on one or more capabilities of the one or more selected vehicles, a weather threshold for each of the one or more selected vehicles;
   monitor weather at one or more locations, wherein the one or more locations are associated with the one or more selected vehicles;
   determine, based on the monitoring and at a threshold time before the first scheduled day, a chance of bad weather at a location for the test drive, wherein the location is one of the one or more locations;
   determine, at the threshold time before the first scheduled day and based on the chance of bad weather exceeding the weather threshold, a potential conflict for the first scheduled day at the location for the test drive;
   cause, by an application on the device and in response to a notification of the potential conflict, popup display of an option for the user to cancel or reschedule the test drive;
   update, via two-way communication with the database and based on an interaction with the notification indicating a second request to schedule the test drive, the interactive calendar appointment; and
   update, via two-way communication with the database, the database to indicate that the one or more selected vehicles are reserved during the test drive on a second scheduled day.

2. The management server of claim 1, wherein the notification comprises an interactive option to reschedule the test drive, and wherein the interaction comprises a selection of the interactive option.

3. The management server of claim 1, wherein the instructions cause the management server to automatically determine the potential conflict by further determining that a ratio of test drives scheduled for the first scheduled day to a number of available salesman exceeds a threshold.

4. The management server of claim 1, wherein the weather threshold comprises at least one of:
   a precipitation percentage,
   a precipitation amount,
   a precipitation type,
   a temperature,
   a wind speed, or
   a weather service warning level.

5. The management server of claim 1, wherein the instructions cause the management server to determine the first scheduled day by:
   determining a number of available employees for each of a plurality of possible dates; and
   selecting the first scheduled day from the plurality of possible dates, wherein the first scheduled day corresponds to a day where the number of available employees exceeds a threshold.

6. The management server of claim 1, wherein the instructions cause the management server to determine, based on correlating demographic information associated with the user with the user preferences and known demographic information for past test drives of a plurality of vehicles, the one or more selected vehicles.

7. The management server of claim 1, wherein the instructions further cause the management server to:
   determine, based on demographic information associated with the user, and based on a third availability of one or more additional vehicles associated with an additional dealer, one or more additional vehicles for the test drive; and
   transmit, via two-way communication with the device, a recommended schedule to test drive the one or more additional vehicles.

8. The management server of claim 1, wherein the device comprises a smartphone, and wherein the popup display comprises a push notification.

9. A method comprising:
   receiving, via two-way communication with a device associated with a user, a first request to schedule a test drive, wherein the first request comprises user preferences for a vehicle, wherein two-way communication comprises communication via a streaming data platform;
   determining, via two-way communication with a database and based on the user preferences, based on received feedback from the device via an interactive calendar appointment, a first scheduled day for a test drive of one or more selected vehicles;

determining, based on one or more capabilities of the one or more selected vehicles, a weather threshold for each of the one or more selected vehicles;

monitoring weather at one or more locations, wherein the one or more locations are associated with the one or more selected vehicles;

determining, based on the monitoring and at a threshold time before the first scheduled day, a chance of bad weather at a location for the test drive, wherein the location is one of the one or more locations;

determining, at the threshold time before the first scheduled day, and based on the chance of bad weather exceeding the weather threshold, a potential conflict for the first scheduled day at the location for the test drive;

causing, by an application on the device and in response to a notification of the potential conflict, popup display of an option for the user to cancel or reschedule the test drive;

updating, via two-way communication with the database and based on an interaction with the notification indicating a second request to schedule the test drive, the interactive calendar appointment; and updating, via two-way communication with the database, the database to indicate that the one or more selected vehicles are reserved during the test drive on a second scheduled day.

10. The method of claim 9, wherein the notification comprises an interactive option to reschedule the test drive, and wherein the interaction comprises a selection of the interactive option.

11. The method of claim 9, wherein the determining the potential conflict further comprises determining the potential conflict by determining that a ratio of test drives scheduled for the first scheduled day to a number of available salesman exceeds a threshold.

12. The method of claim 9, wherein the weather threshold comprises at least one of:
a precipitation percentage,
a precipitation amount,
a precipitation type,
a temperature,
a wind speed, or
a weather service warning level.

13. The method of claim 9, further comprising:
determining a number of available employees for each of a plurality of possible dates; and
selecting the first scheduled day from the plurality of possible dates, wherein the first scheduled day corresponds to a day where the number of available employees exceeds a threshold.

14. The method of claim 9, further comprising determining, based on correlating demographic information associated with the user with the user preferences and known demographic information for past test drives of a plurality of vehicles, the one or more selected vehicles.

15. The method of claim 9, further comprising
determining, based on demographic information associated with the user, and based on a third availability of one or more additional vehicles associated with an additional dealer, one or more additional vehicles for the test drive; and
transmitting, via two-way communication with the device, a recommended schedule to test drive the one or more additional vehicles.

16. The method of claim 9, wherein the device comprises a smartphone, and wherein the popup display comprises a push notification.

17. A system comprising:
a first server comprising:
one or more first processors; and
a first memory storing first instructions that, when executed by the one or more first processors, cause the first server to:
receive, via two-way communication with a device associated with a user, a first request to schedule a test drive, wherein the first request comprises user preferences for a vehicle, wherein two-way communication comprises communication via a streaming data platform;
send, via two-way communication with a second server and based on the user preferences, based on received feedback from the device via an interactive calendar appointment, a first scheduled day for a test drive of one or more selected vehicles;
determine, based on one or more capabilities of the one or more selected vehicles, a weather threshold for each of the one or more selected vehicles;
monitor weather at one or more locations, wherein the one or more locations are associated with the one or more selected vehicles;
determine, based on the monitoring and at a threshold time before the first scheduled day, a chance of bad weather at a location for the test drive, wherein the location is one of the one or more locations;
determine, at the threshold time before the first scheduled day and based on the chance of bad weather exceeding the weather threshold, a potential conflict for the first scheduled day at the location for the test drive;
cause, by an application on the device and in response to a notification of the potential conflict, popup display of an option for the user to cancel or reschedule the test drive;
receive, via two-way communication with the second server and based on an interaction with the notification indicating a second request to schedule the test drive, the interactive calendar appointment; and
send, via two-way communication with the second server, an indication that the one or more selected vehicles are reserved during the test drive on a second scheduled day; and
the second server comprising:
one or more second processors; and
a second memory storing second instructions that, when executed by the one or more second processors, cause the second server to:
receive, via two-way communication with the first server, the first schedule day for the test drive of the one or more selected vehicles;
send, via two-way communication with the first server, the interactive calendar appointment; and
receive, via two-way communication with the first server, the indication that the one or more selected vehicles are reserved.

18. The system of claim 17, wherein the second instructions, when executed by the one or more second processors, further cause the second server to:
update, based on the first scheduled day; a calendar associated with one or more dealership employees, wherein the updating comprises assigning a dealership employee of the one or more dealership employees to the test drive; and
adjust, based on the second scheduled day, the calendar.

* * * * *